Feb. 24, 1925.
A. E. THOMPSON
AUTOMOBILE TRUCK
Filed May 9, 1921

Inventor
Arent E. Thompson
by Otto M. Wernich
Atty

Patented Feb. 24, 1925.

1,527,658

UNITED STATES PATENT OFFICE.

ARENT E. THOMPSON, OF CHICAGO, ILLINOIS.

AUTOMOBILE TRUCK.

Application filed May 9, 1921. Serial No. 467,886.

*To all whom it may concern:*

Be it known that I, ARENT E. THOMPSON, a citizen of the United States, residing at Chicago, in the county of Cook and State of Illinois, have invented a certain new and useful Improvement in Automobile Trucks, of which the following is a full, clear, concise, and exact description, reference being had to the accompanying drawings, forming a part of this specification.

The invention relates to motor trucks and particularly to those designed to provide a truck the body or box of which is capable of being raised to the desired height substantially parallel to the chassis or vehicle frame, and again similarly lowered to a position in which it rests upon the chassis of the truck.

In addition to the above it is an object to provide an arrangement in which one end of the body may be raised to incline the box and allow any material therein to be discharged from the opposite end when the same is either in a raised or lowered position with relation to the chassis or frame of the vehicle.

It is also an object to provide an arrangement which automatically controls the mechanism whereby the body is raised and lowered to arrest the movement of the body during the raising and lowering operation, and also to employ a structure which will not bind or jamb and thereby interfere with the proper operation of the parts during this raising and lowering of the body.

It is a further object to employ a structure which is actuated by the engine of the truck, said structure being capable of being controlled from the driver's seat. It is also an object to provide a construction which is positive in its action, and employs an arrangement which will hold the body in a raised or intermediate position, and prevent its being dropped in the event that some portion should become broken, thereby adding to the safety of the operator or others whose duty it is to perform work at the location where the filling or unloading operation is taking place.

The invention will be more readily understood when read in conjunction with the accompanying drawings, in which various arrangements of which the invention is susceptible are illustrated, it being therefore obvious that other arrangements may be resorted to without departing from the spirit of the invention as expressed in the appended claims forming a part hereof.

In the drawings

Fig. 4 is a plan view of the forward portion of the structure shown in Fig. 2, illustrating a gear mechanism which is employed in one embodiment of the invention;

In the particular embodiment of the invention illustrated in the drawings the engine of the truck provides the means for actuating the mechanism whereby the body or box is raised and lowered, the latter mechanism being connected with a gear structure which is in turn connected to the transmission of the engine. This gear structure is controlled by suitable lever and link connections, the former being arranged adjacent the driver's seat, so that they are readily accessible when it is desired to cause the mechanism to move the body to raise or lower it. The body or box is provided with a means which cooperates with this lever and link structure to automatically render the lifting mechanism inoperative when the box or body is raised to the desired height and includes an arrangement whereby the box or body is brought to a rest when it reaches its lowermost position or a position upon the chassis of the truck.

The actuating means includes a suitable shaft and gear mechanism which rotates a plurality of threaded posts, one of which is arranged at each corner of the box or body and may be rotated to cause the box or body to be raised or lowered depending upon the direction in which these threaded posts are rotated. The box or body is mounted upon a pair of inverted U shaped frames, the lowermost ends of which are secured to an element which rides upon the threaded posts. This element is constructed to provide a universal connection between the posts and the U shaped frames and insures against cramping or binding the parts to thereby prohibit the raising or lowering of the box or body. The U shaped frames and the element which rides upon the screw threaded members are provided with a construction which permits said frames to assume a position of rest upon the chassis and thereafter allow said element to move with relation to the frame so that when these frames are at rest upon the chassis the entire weight of the box and its load will be carried by the chassis and none will be exerted upon the screws.

In a modified arrangement the box or body is pivotally connected to one of these U shaped frames and the opposite end has cooperatively connected therewith a mechanism for raising and lowering this last named end, when the box or body is in either an elevated or lowered position. A truck provided with a body capable of being bodily raised and lowered is particularly advantageous, in that the truck may be loaded at one level and when reaching its destination may be raised so that the hoppers are brought into alignment with openings in coal or other bins which are usually elevated somewhat from the ground. The hopper doors may then be opened and the material may be discharged directly into the bin, thus eliminating the manual labor necessary for unloading the box.

In the modified structure the end gate of the body need only be released and it is evident that when the opposite end is elevated the material in the box will be discharged from this end.

The structure shown in Figures 1 to 8, includes the chassis 10 mounted upon the wheels or trucks 11—11 and is provided with the usual driver's seat 12, motor 13 and other devices entering into the truck structure. The levers 14 and 15 are arranged adjacent the driver's seat and control a mechanism hereinafter to be explained, which causes the body or box to be raised and lowered. The chassis or underframe 10 carries the transversely arranged beams or frames 16 and 17, which are positioned below and at the opposite ends of the underframe. These beams or frames 16 and 17 extend beyond the side of the chassis and carry the vertically arranged screw threaded members 18, 19, 20 and 21. These threaded members are enclosed in the channel shaped uprights 22—22, within which the ends of the inverted U shaped brackets 23—23 operate, the latter being secured to an arrangement 24, which will hereinafter be termed a universal joint and arranged upon the screw threaded members 18 to 21. The transverse beams or frames 16 and 17 house various other elements which enter the structure and are held with relation to the chassis in a different plane by means of the yokes 25—25, which also secure the I beams 26—26 to the chassis.

Figure 1:
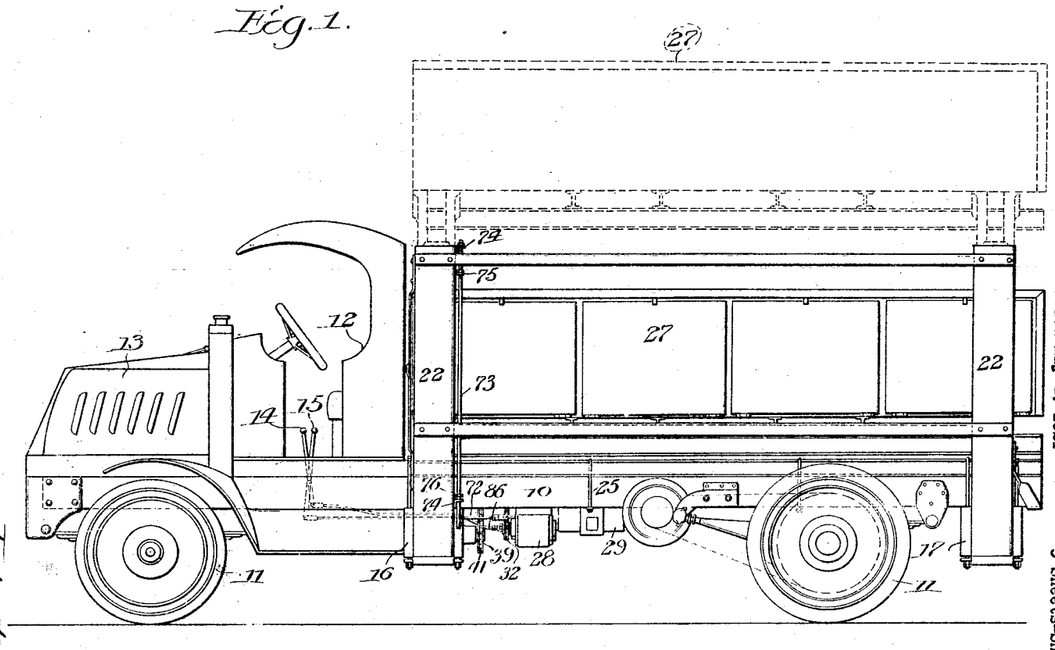
Fig. 1 is a side elevation of a motor truck constructed according to one embodiment of the invention.
Figure 2:
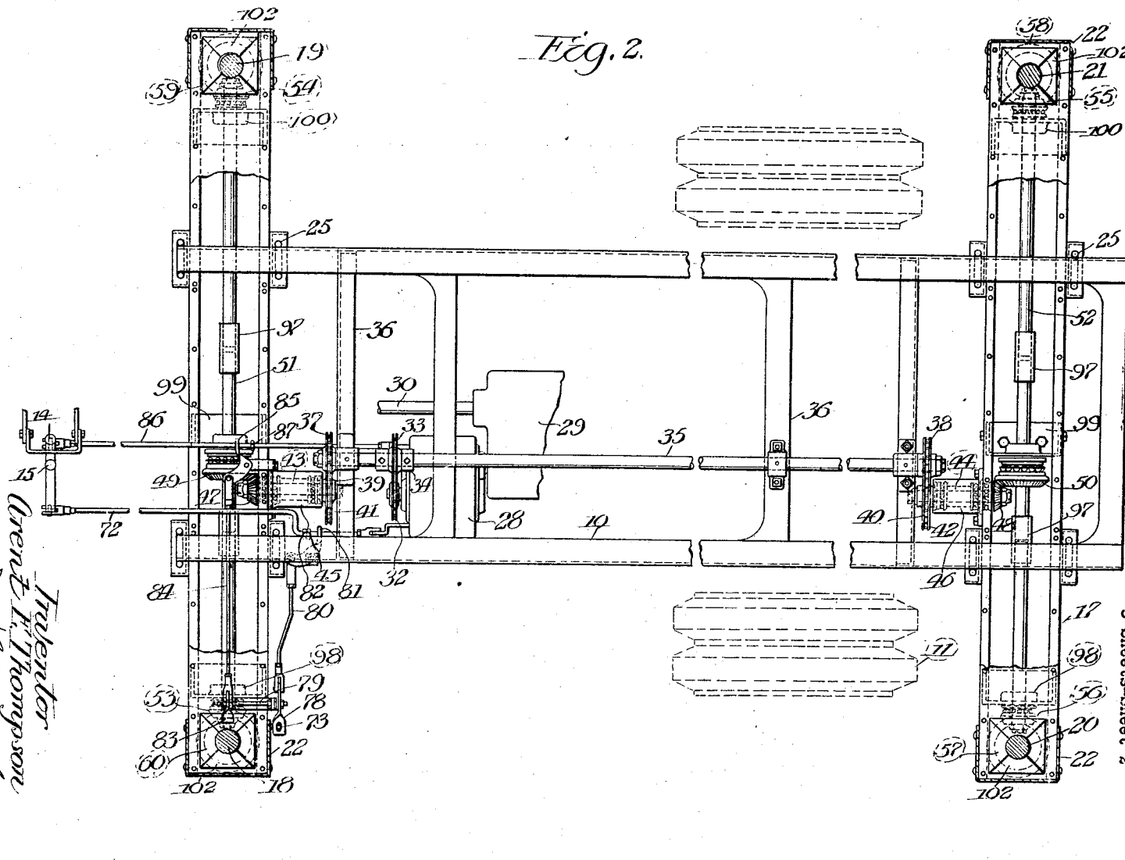
Fig. 2 is a plan view of a chassis with the truck body or box removed.
Figure 3:
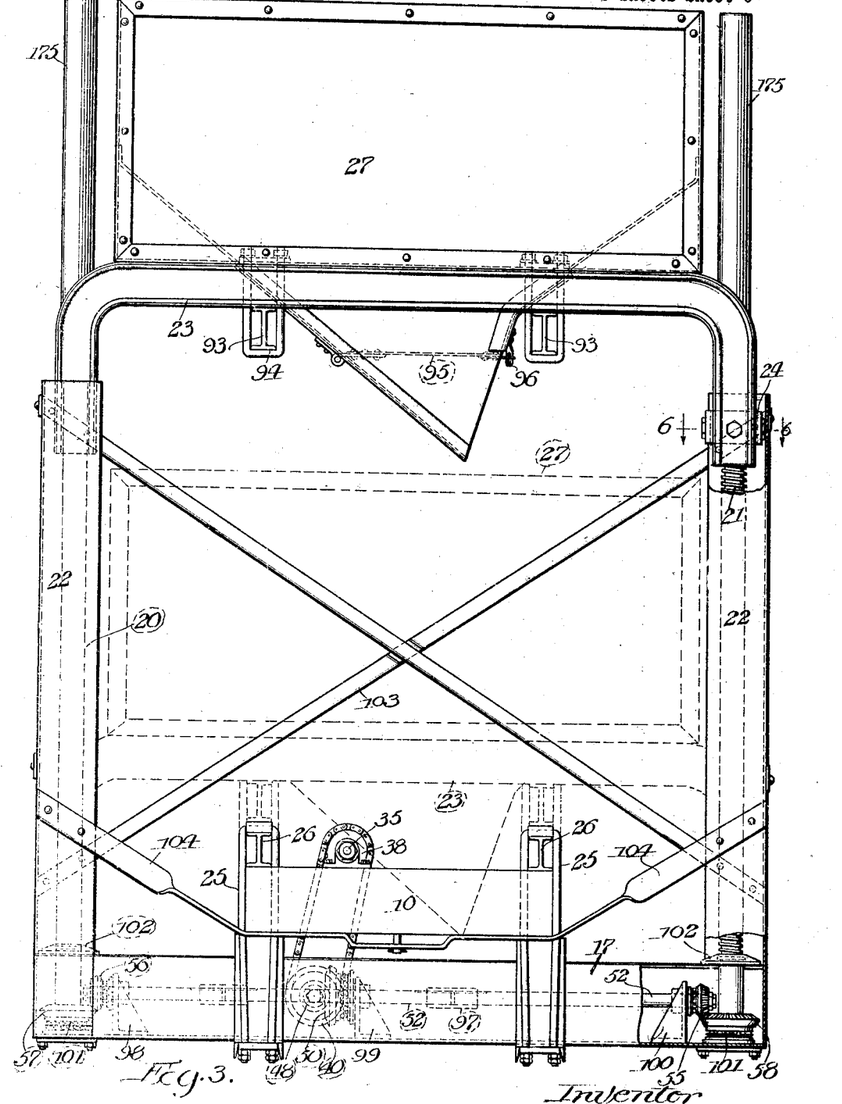
Fig. 3 is a rear elevation of the structure shown in Fig. 2, drawn to a larger scale.
Figure 5:
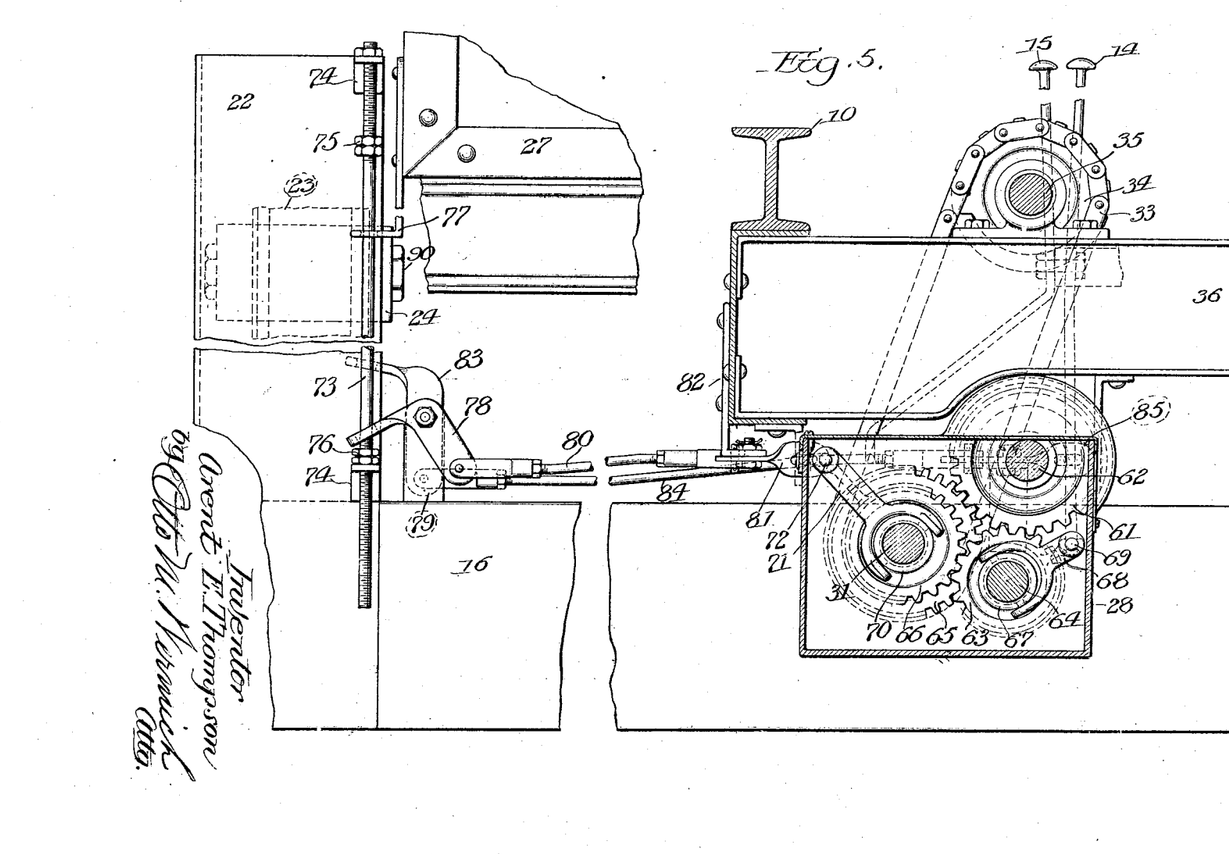
Fig. 5 is a section taken on line 5—5 of Fig. 4.
Figure 6:
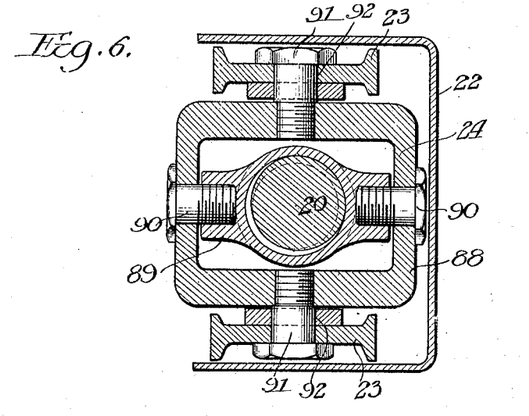
Figs. 6 and 7 are sectional views of a universal connection employed in the structure.
Figure 7:
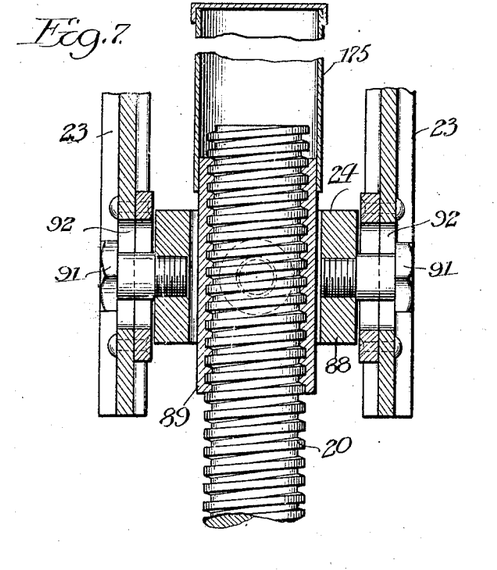
Figure 8:
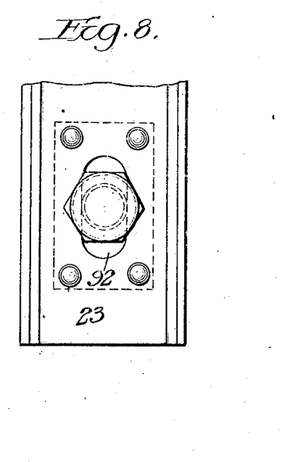
Fig. 8 is a side elevation of the lowermost end of a part shown in Figs. 6 and 7.

As before stated, the body or box 27 is raised and lowered by means of the motor of the truck, and this is accomplished by connecting a gear transmission 28 which is designed to cooperate with the transmission 29 of the motor, the latter of which is driven by the shaft 30. A jack shaft 31 extends from the transmission case 28 and is provided with a sprocket 32 and a chain 33 which extends to and into engagement with a sprocket wheel 34 arranged upon the shaft 35. This shaft is supported in bearings attached to the cross beams 36—36 and is provided with the sprocket wheels 37 and 38, which are respectively arranged at the opposite ends of this shaft. Sprocket chains 39 and 40 are provided which connect this shaft with sprocket wheels 41 and 42 arranged upon the shafts 43 and 44 which are mounted in the supports or housings 45 and 46, which are connected to the transverse frames or beams 16 and 17. The opposite ends of these last named shafts 43 and 44 are respectively provided with the beveled gears 47 and 48 which mesh with the larger gears 49 and 50, secured to the transverse shafts 51 and 52 arranged within the housing or transverse members 16 and 17. Beveled gears 53 and 54 are secured to the shaft 51 and similar beveled gears 55 and 56 are connected to the shaft 52. These gears respectively mesh with beveled gears 60, 59, 58, and 57 arranged upon the lowermost end of the screw threaded rotatable members 18, 19, 20 and 21.

From the foregoing description it is evident that when the engine is running, the shaft 35 is rotated which through the various instrumentalities connected therewith will cause a rotation of the screw threaded members, in the proper direction, depending upon the particular relative arrangement of the gears arranged in the transmission case 28. This gear arrangement is shown in detail in Figs. 4 and 5 of the drawings, and includes the gear 61 secured to the shaft 62 which extends from the transmission case 29, the idler gear 63 is arranged upon a shaft 64 directly below the shaft 62 and the gears 65 and 66, which are integral with each other and arranged upon the shaft 31. These gears and their cooperating mechanism control the raising and lowering of the truck box or body. The gear 63 is provided with a circumferentially grooved extension 67 provided for the reception of the bifurcated end of an extension or arm 68 arranged upon the slide rod 69 which extends toward the forward end of the machine and is connected to the lever 15 arranged adjacent the driver's seat. The integral gears 65 and 66 are also provided with a circumferential grooved collar 70, with which the bifurcated arm or extension 71 cooperates. This arm is connected to the slide bar 72 which also extends forwardly and is connected to the lever 15 arranged adjacent the driver's seat. The gears 63, 65 and 66 are movable upon their shafts so that they may be brought into and out of cooperative relation to the gear 61 arranged upon the shaft 62.

When the lever 14 is moved to actuate the rod 72 the large gear 65 is brought into mesh with the gear 61 arranged upon the shaft 62. This causes the box or body to be raised or elevated. To cause the body to be lowered the gears 65 and 66 are brought to the position shown in Fig. 4 and the lever 15 is actuated, which moves the slide rod 69 forwardly and brings the gear 63 into mesh with the gears 61 and 66. This causes a reverse action to be imparted to the parts which causes the box or body to be lowered to a position of rest upon the chassis of the truck.

From the foregoing description it is evident that the shaft 35 will be rotated in either a clockwise or counter clockwise direction, or may remain stationary depending upon the particular or relative position which the gears are caused to assume, and therefore the body will either be raised, lowered or held in either of its raised or lowered positions.

As before stated, the structure is provided with a means whereby the body will be automatically arrested in its movement in either an upward or downward direction. The means for arresting the upward movement of the box or body includes a vertically arranged reciprocable rod 73 secured by means of the brackets 74—74 to one of the most forward channel shaped members 22. This rod carries the nuts 75 and 76 which act as abutments and are arranged for threaded adjustment with relation to the rod. The nuts or abutment 75 cooperate with the bracket 77 which is secured to the body to lift the rod 73 upwardly and thereby cause the abutment 76 to be brought into engagement with the bell crank lever 78 which is carried by the bracket 79 secured to the transverse beam 16. This causes the bell crank to be moved which also actuates the connecting rod 80. The opposite end of this connecting rod is secured to another bell crank lever 81 pivotally attached to a bracket 82 secured to the chassis 10 of the truck. This last mentioned bell crank lever 81 has one end thereof provided with an aperture which permits the rod 72 to be passed therethrough and allows this portion of this lever to engage the abutment 82 provided upon the rod 72 to move said rod. Thus the gear 65 is moved out of engagement with the gear 61 with which it has been previously brought into mesh by the actuation of the lever 14. This action arrests the movement of the body in an upwardly direction. The bracket 79 also carries another bell crank lever 83, which is arranged as shown in Fig. 2 substantially in the center of the uppermost face of the transverse frame or beam 16 and projects into the path of the universal connection 24. A rod 84 is connected to the opposite end of the bell crank and has its opposite end connected to the bell crank lever 85 (Fig. 4). The other end of this lever is apertured to receive the rod 86, which is pivotally connected to the rod 69 carrying the fork 68 which engages and moves the idler gear 63. When the rod 86 is moved to cause the idler 63 to be brought into engagement with the gears 61 and 66, the abutment 87 provided upon this rod is engaging one end of the bell crank lever 85. Thus when the bell crank lever 85 is actuated by the engagement of bell crank 83, and the universal connection, the rod 86 and its associated parts will also be moved which disengages the idler gear 63 and the gears 61 and 66 which prevents any further movement of the body in a downward direction. The universal connections 24 are cooperatively arranged with respect to each of the vertically arranged screw threaded members, such as 18, 19, 20 and 21, and include the substantially rectangular hollow member 88 to which the pivoted member 89 is attached by means of the screws 90—90. This member 89 is provided with an internal screw thread, into which one of the threaded members such as 18 are threaded. Thus as these threaded members, such as 18, are rotated, the universal connection will be moved along the same either in an upward or downward direction, depending upon the direction in which these members are rotated. The rectangular portions 88 are in pivotal connection with the I beams 23—23, they being held in this manner by means of the studs 91—91. The shank of these studs are arranged in the slots 92—92 provided in the ends of the I beams. By an inspection of Fig. 6, it can readily be seen that regardless of the angular position which the various parts may assume, these parts composing this universal connection will eliminate any possibility of binding or cramping which insures the proper operation of the parts to lift and lower the box, body or load. The slots 92 are provided so that the universal connection may move with relation to the I beams, when the latter reach a lowered position and rest upon the chassis which relieves the universal connection of the load and transmits it directly to the chassis when the box or body is in its lowermost position. The relative position of this universal connection, the ends of the I beams and the lever 83 is such, that when the I beams attain a position of rest upon the chassis the universal connection must travel a slight distance downwardly relatively to the I beams before it can engage the lever 83 to disconnect the gears hereinbefore referred to. This insures the load being transmitted to and carried by the chassis. When the body or box 27 is in this lowered position the I beams 93 rest against the I beams 26—26. These I beams 93 are secured to the inverted I beams 23 by means of the yokes 94 which also secure the body to both I beams 23 and 93.

In this form of body construction the box or body is provided with a hopper bottom having doors or gates 95 which are held in locked or closed relation by means of the latch generally designated 96. This arrangement permits the material to be discharged in a lateral direction.

Referring more specifically to the shafts, such as 51 and 52, which are clearly shown in Fig. 2, it will be noted that the same are composed of sections which are connected together by means of the couplers 97—97. This arrangement is resorted to to allow the shaft or portions thereof to be removed from the transverse frames or beams such as 16 and 17, in the event of repairs being found necessary without necessitating the removal of the threaded posts 18 to 21. These shafts 51 and 52 are mounted in anti-friction bearings arranged in brackets 98, 99 and 100, which are carried by the transverse frames or beams 16 and 17. The ends of the vertically arranged threaded members such as 18 to 21, are seated against anti-friction bearings 101 and are further supported in bearings 102 which are secured to the frames or beams 16 and 17. The channel shaped members 22 house the rotatable threaded shafts and are supported by being secured to the transverse frames or beams 16 and 17, and by the stay bars such as 103 and 104 which hold these channel shaped members with relation to the chassis.

From the foregoing description it is evident that a means is provided whereby the box or body may be bodily raised and lowered substantially parallel to the chassis and that this raising and lowering action is controlled by a means which includes suitable levers arranged adjacent the seat. It is further evident that this raising and lowering action is automatically arrested when the body or box reaches its raised or lowered position. It is also evident that when the box or body is in its lowered position the weight or load is transmitted from the screw threaded members directly to or upon the chassis of the truck.

The structure illustrated in Figs. 9 to 15, inclusive, may be utilized to raise the body or box in a manner similar to that hereinbefore described, and in addition permits one end of the box or body to be raised and lowered, so that the material may be discharged from the opposite end when the box is either at rest upon the chassis or is elevated in the manner hereinbefore explained. In this embodiment of the invention the box or body is pivotally secured to and rests upon a pair of I beams which in turn are mounted upon the inverted U shaped frames 23ª, which are raised and lowered in a manner hereinbefore described. The body is pivoted at one end upon a shaft 129. The gear mechanism employed in this embodiment of the invention is most clearly shown in Figs. 11 and 12 and includes the drive shaft 105 which is connected to the transmission of the engine in a manner similar to the previously described structure. This shaft is provided with one part of a clutch 106 which is secured to the shaft. A clutch member 107 is also arranged upon the shaft and slides thereon into and out of engagement with the clutch 106. This last named portion of the clutch is provided with a sleeve 108 which is arranged in a bearing 109 carried by the support 110. The sprocket wheel 111 is arranged upon the sleeve 108 and is keyed thereto so that the sleeve and the sprocket rotate together. A lever 112 connecting rod 113 and fork 114 are provided to move the sleeve 108 with relation to the shaft 105 into and out of engagement with the clutch 106. This mechanism controls the actuation of the sprocket 111 and by virtue of the fact that this sprocket is connected through the medium of the sprocket chain 115 with the sprocket wheel 116, the actuation of the mechanism associated therewith is also controlled. The sprocket 116 is secured to a jack shaft 117 upon which the gear 118 is slidingly mounted, it being keyed thereto so that these portions will rotate with each other. This last mentioned gear 118 is slidably arranged upon this shaft and is therefore provided with a collar having a circumferential groove into which the forked end of the arm 119 is arranged.

Figure 11:
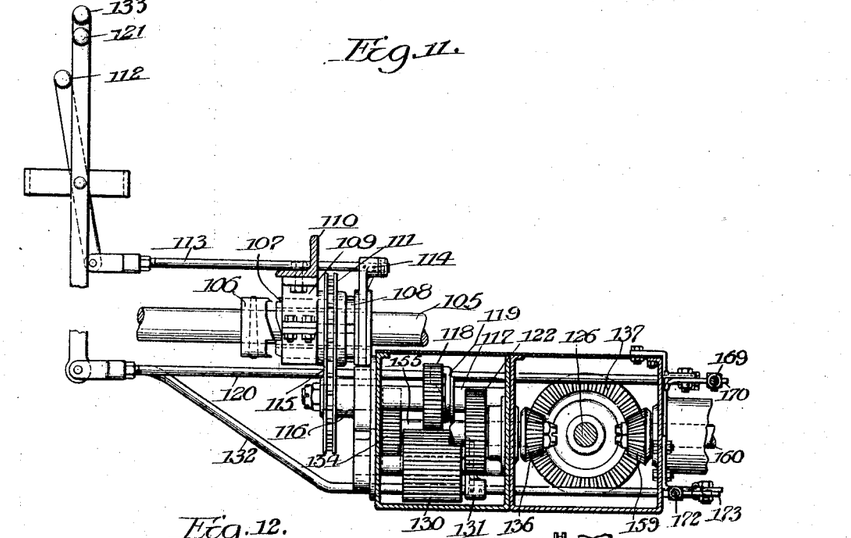
Figs. 11 and 12 are side and plan views of a gear mechanism employed in connection with the structure shown in Figs. 9 and 10.
Figure 12:
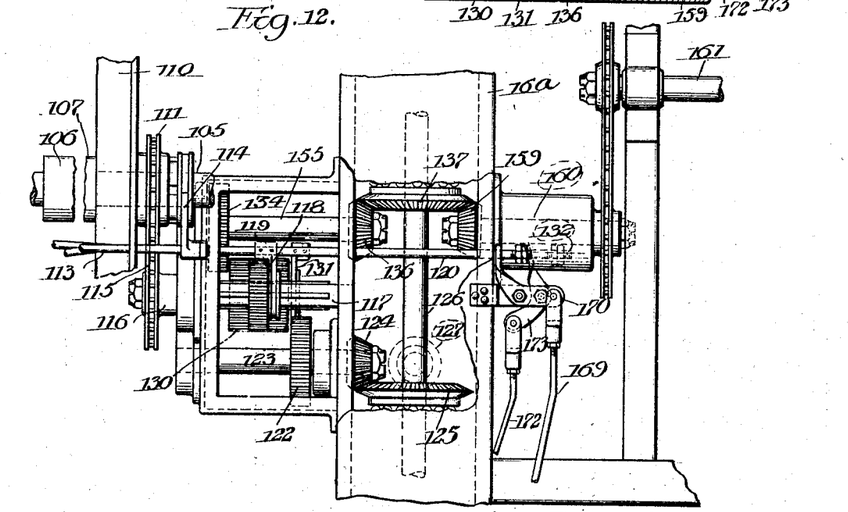
Figure 13:
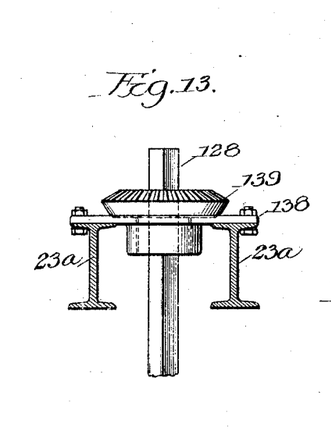
Figs. 13, 14 and 15 are details of construction employed in arrangement shown in Figs. 9 to 12.
Figures 14, 15:
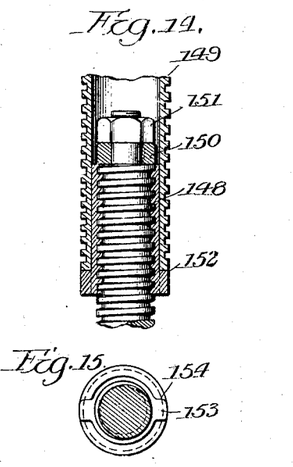

The opposite end of this arm is connected to the slide rod 120, one end of which is connected to the lever 121. The other end of this rod cooperates with an arrangement hereinafter to be explained for automatically arresting the action of the previously referred to mechanism. The sliding gear 118 is adapted to be moved into engagement with the gear 122 arranged upon and secured to the shaft 123. A beveled pinion 124 is secured to one end of the shaft 123 and meshes with the beveled gear 125 which is loosely arranged upon the shaft 126, the latter being arranged in and secured to the transversely arranged beam such as 16ª. This gear 125 meshes with a pinion 127 arranged upon the lowermost end of the vertically arranged squared rod generally designated 128, which cooperates to actuate certain mechanism which lifts one end of the box or body to incline it when the body is in either a raised or lowered position relative to the chassis.

Provision is also made for rotating this squared shaft in the opposite direction to cause this end of the box or body to be lowered from its inclined position. This means includes the sliding gear 130, the face of which is sufficient in width to permit it to mesh with one or more of the gears such as 118, 122 or 134 when shifted to the proper position. This gear 130 also has a forked arm 131 associated with it, which is secured to the slide rod 132 one end of which is secured to the lever 133 arranged adjacent the driver's seat. By manipulating this last named lever the gear 130 may be caused to mesh with either the gear 122 or the gear 134. The latter gear is provided to assist in lifting the box or body parallel to the chassis of the truck in a manner similar to that described in connection with the structure illustrated in Figs. 1 to 8. When this end of the body is to be lowered from its inclined position the gear 130 is brought into mesh with the gear 118 and the gear 122. This causes the squared shaft to be rotated in the opposite direction.

In Figs. 9 and 12 to 15 is illustrated in detail the mechanism whereby the body may be tilted or inclined relatively to the chassis. This mechanism includes the pinion 127 secured to the shaft 135 journaled in the bearing 136 which is secured to the forward endmost or transverse element 16ª. A universal joint 137 is provided and connects the shaft 135 and the squared shaft 128. This shaft 128 is arranged between one pair of inverted U shaped supports 23ª and is provided with a bearing plate 138 having a collar and providing a bearing for the boss of a pinion 139. This pinion 139 is provided with a squared aperture for the reception of the squared shaft 128 and thus as the shaft is rotated the pinion will also be rotated. This pinion meshes with another gear 140 which is secured to a shaft 141 which is passed through the upwardly extending portions of the member 142. A yoke shaped member 143 is arranged so that the shaft 141 may be passed through the same and provide a pivot therefor. These members 142 and 143 are pivotally connected at 144 to the plates 145 and cooperate with each other to provide a universal joint which will compensate for various positions which the other parts may assume relative to each other. The shaft 141 has also a pinion 146 secured thereto. This pinion meshes with a gear 147 connected to the lowermost end of the part 148 which threads into the part 149. This arrangement provides what might be termed a twin or telescopic screw which is secured to one end of the body by means of the pivoted element 150' which is provided with screw threads to permit the portion 149 to assist in lifting the body to its fullest height. These telescopic screw threaded members are constructed so that these portions will be rotated consecutively, that is one will be rotated to lift the body a certain distance and then both will be rotated together to complete the lifting operation. To accomplish this the inner screw 148 is provided with a collar 150 and a nut 151 for securing the collar thereto. The outer member 149 is provided with a sleeve 152 which is secured against rotating with respect to this outer member by means of the projections 153 which are arranged in the recesses 154 provided in the threaded member 149, and when the parts assume the position shown in Fig. 14, the frictional contact between the collar and the member 152 causes the members 148 and 149 to rotate with each other. Upon the reverse rotation of the parts 148 and 149 this frictional contact will be maintained which causes both screws to be rotated together in the reverse direction, which lowers the end of the box upon the threaded member 149 until the pivoted element 150' reaches the lowermost end thereof and contacts with the unthreaded portion of the sleeve 152. This locks these parts together and prevents their relative rotation, which releases the frictional contact between the collar 150 and the sleeve 152 and allows the threaded member 148 to rotate within the threaded outer member 149 which lowers the member 149 with respect to the member 148.

Figure 9:
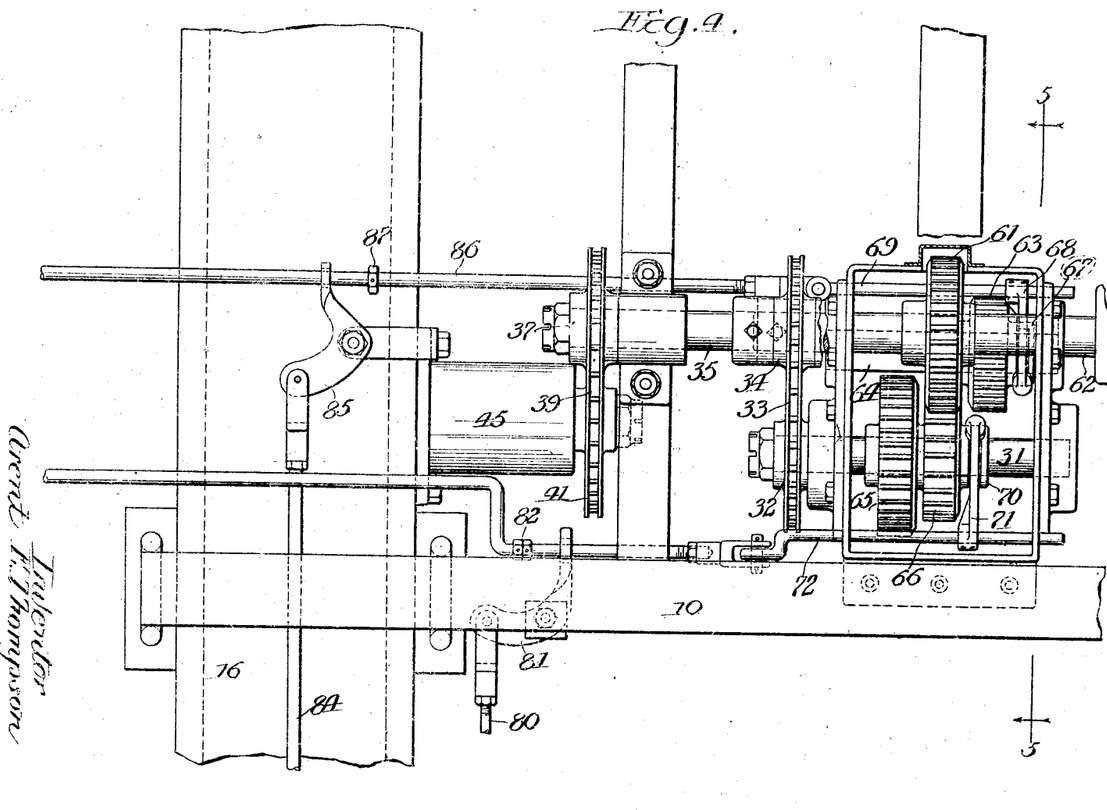
Fig. 9 is a front elevation showing a modified arrangement in which the body is raised substantially parallel to the chassis and is also permitted to be tilted at one end when in either a raised or lowered position.
Figure 10:
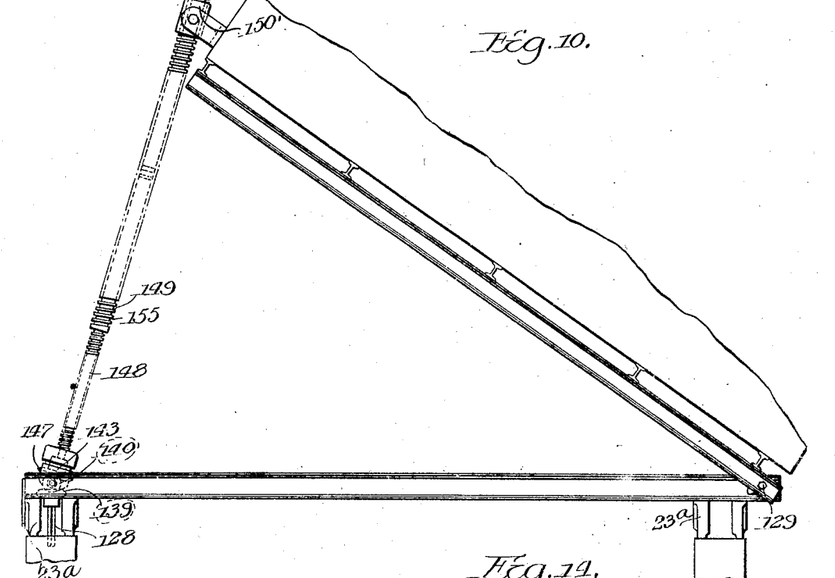
Fig. 10 is a side elevation of the arrangement shown in Fig. 9.

From this it can be seen that the box or body may be tilted and lowered upon the pivot shaft 129 when the frame to which it is connected, is at rest upon the chassis of the truck. When the parts are in this last named position the beveled gear 139 is in its lowermost position upon the squared shaft 128. This shaft is of a length sufficient to extend so that this gear 139 may be rotated to actuate the screw members to tilt the box or body when the box or body is in its raised position, as shown in Fig. 9. To raise and lower the body parallel to the chassis, the gear 118 (Fig. 12) is caused to mesh with the gear 134. This causes the rotation of the shaft 155, the pinion 136, the gear 137 and the shaft 126. The rotation of this shaft 126 causes the rotation of the lifting screws such as 18 and 19 arranged at the forward end of the truck. A pinion 159 meshes with the gear 137 and by virtue of the chain and sprocket connection between the shafts 160 and 161 the last mentioned shaft is rotated. This shaft is similar to that designated by the numeral 35 in Fig. 2 and actuates the lifting screws 21 and 22 to raise and lower this end of the body or box parallelly to the shaft. To cause the box or body to be lowered parallelly to the chassis from its raised position the gear 118 will be positioned as shown in Fig. 12 and the idle gear 130 is brought to a position in which it meshes with both of the gears 134 and 118. This causes the shaft 155 and its associated mechanism to be rotated in the reverse direction which causes the body to be lowered. When the body or box is in its raised position as shown in full lines in Fig. 9, it is evident that the rotation of the shaft 128 will cause the twin screws 148 and 149 to be rotated to cause the inclination of the box or body relative to the chassis in a manner similar to that explained in the foregoing description of this mechanism.

A structure such as that just described wherein the body may be tilted and lowered when the same is at rest upon the chassis and which may be raised parallel to the chassis and then tilted, may also be provided with a means for automatically arresting the movement of the body when the same is moved parallel to the chassis to raise or lower it. This means is illustrated in Figs. 9 and 11 and 12, and includes the vertically arranged vertically reciprocable rod 162 which is carried by the brackets 163 and 164 secured to the channel shaped housing 22ª. A bracket 165 is secured to one of the beams 23ª and extends into engagement with the rod 162 so that it may cooperate with the stop 166 arranged near the uppermost end of the rod. When the body or the beam which carries the body reaches its uppermost position, it engages the stop and lifts the rod 162 which actuates the bell crank lever 167 arranged adjacent the lowermost end of the rod, the latter being engaged by the stop 168. This bell crank lever is connected to a rod 169 the opposite end of which is secured to a bell crank lever 170 (Fig. 12). This bell crank lever is in turn secured to the rod 120 which moves the rod and disengages the gear 118 and the gear 134, which have previously been brought into engagement with each other to cause the body to be raised parallel to the chassis. The means employed to arrest the downward movement of the body includes the bell crank lever 171 arranged in the path of the end of the inverted U shaped support 23ª. This bell crank is connected to the rod 172 which is in turn connected to the bell crank lever 173, the latter of which is connected with the rod 132 which leads to and connects with the large or wide gear 130. When this structure is moved the gear 130 which has previously been brought into mesh with the gears 118 and 134, is caused to be thrown out of mesh which arrests the downward movement of the body and restores the lever 133 to its normal position. The lifting screws 18 to 21, inclusive, may each be provided with a tubular member 175 provided to prevent dirt and dust from reaching these screws and interfering with their proper operation.

From the foregoing description it is evident that a structure is provided in which the box or body may be lifted bodily parallel to the chassis, or may be tilted when in a lowered position, and may be raised and then tilted at an angle to the chassis. This raising and lowering of the body being actuated by means of the motor which propels the vehicle. It is also evident that the structure employed is such that the parts can not bind and prevent the proper operation of the mechanism, even though the dumping or lifting operation is being performed when the vehicle is inclined laterally by reason of an elevation or inclination in the road or surface upon which it is being operated.

Furthermore, the possibility of injury to the operator caused by the sudden dropping of the body is reduced to a minimum, as the screw threaded lifting elements arranged at each corner of the box or body will hold the same in an elevated position, even though some other cooperating mechanism should break, or give away. By employing these screw threaded members the body is positively and readily actuated and the body raised or lowered with comparative ease.

Having described the invention what I claim and desire to cover by Letters Patent is:

1. In a vehicle of the class described, the combination of a beam adapted to be associated with the chassis of a vehicle, said beam having lifting elements arranged at its opposite ends, a shaft supported by said beam having means for driving said lifting elements a drive shaft for actuating the shaft for the lifting elements and carried by said beam forming a connection between said drive shaft and the shaft for driving the lifting elements.

2. In a vehicle of the class described, the combination of a beam adapted to be arranged below and secured to the chassis of a vehicle, said beam having lifting elements arranged at its opposite ends, a shaft for actuating said lifting elements, said shaft being supported by said beam, means for actuating said shaft, a vehicle body support secured to the lifting elements and arranged above the chassis of the vehicle and being operable along the lifting elements to raise and lower the body.

3. In a vehicle of the class described the combination of a vehicle frame, a vehicle body carried by the frame, means for raising and lowering the body with respect to the frame, means for inclining the body with respect to the frame when said body is raised, said means including an actuating mechanism arranged adjacent the vehicle frame.

4. In a vehicle of the class described the combination of a vehicle frame, a vehicle body carried by the frame, means for raising and lowering the body with respect to the frame, means for inclining the body with respect to the frame when said body is raised, said means including an actuating mechanism arranged adjacent the vehicle frame and a shaft extending from the vehicle frame to the body when said body is in its elevated position.

5. In a device of the character described, the combination of a frame, a body adapted to be raised and lowered with respect to the frame, means for raising and lowering said body in a plane substantially parallel with respect to the frame, said means including a plurality of vertically arranged rotatable elements cooperatively connected with the body and a connection between the rotatable elements and the body which is movable relatively to the body when said body is brought to rest.

6. In a device of the class described, the combination of a vehicle frame, a vehicle body carried by the frame, said body being movable towards and away from the frame in substantial parallel relation to the frame, and being permitted to be inclined relatively to said frame when in a raised or lowered position means for causing the inclination of said body said means being operable by a means arranged adjacent the vehicle frame.

7. In a device of the class described, the combination of a vehicle frame, a vehicle body carried by the frame, said vehicle body being movable in a plane substantially parallel to the frame and being permitted to be tilted at an angle to the frame, means for raising said body parallel to the frame, means for tilting the body at an angle to the frame, said means including screw threaded rotatable elements cooperating with said body to lift and tilt the same, said second mentioned means being operable by a means arranged adjacent the vehicle frame.

8. In a device of the class described, the combination of a vehicle frame, a body carried by the frame, means for raising and lowering said body in a plane substantially parallel to the frame, said body being also movable to an angle with respect to the frame when raised, a gear mechanism for raising said body, means operable to tilt the body when raised, said means being operable by said gear mechanism.

9. In a device of the class described, the combination of a vehicle frame, another frame, a body carried by said second mentioned frame, said second mentioned frame being permitted to be raised and lowered in a plane substantially parallel to the vehicle frame, means carried by the vehicle frame for moving the second mentioned frame, said body being permitted to tilt relatively to said second mentioned frame, means for tilting said body, said means being connected to the second mentioned frame, and means for actuating said tilting means, said last mentioned means being mounted upon the vehicle frame.

10. In a device of the class described, the combination of a vehicle frame, another frame, a body secured to the second mentioned frame, said body and last mentioned frame being movable in a plane substantially parallel to the vehicle frame, the body being movable with respect to the second mentioned frame, means for raising and lowering said second mentioned frame, a universal connection between said means and the frame, means for raising and lowering said body with respect to the second mentioned frame, and a universal connection between said raising means and said body.

11. In a vehicle of the class described, the combination of a vehicle frame, frames arranged transversely to and adjacent the opposite ends of the first mentioned frame, rotatable threaded elements arranged adjacent the opposite ends of said transversely arranged frames, members extending transversely across the vehicle frame and having their opposite ends connected to the threaded elements, said members which extend transversely across the vehicle frame being actuated upon the operation of the threaded elements to raise and lower said members and a vehicle body arranged upon said member.

12. In a vehicle of the class described, the combination of a vehicle frame, frames arranged transversely to and adjacent the opposite ends of the first mentioned frame, rotatable threaded elements arranged adjacent the opposite ends of said transversely arranged frames, members extending transversely across the vehicle frame and having their opposite ends connected to the threaded elements, said members being permitted to be raised and lowered upon the operation of the threaded elements, a vehicle body arranged upon said members, said members being permitted to contact with said transversely arranged frames when said body is in its lower position.

13. In a vehicle of the class described the combination of a vehicle frame, frames arranged transversely to said first mentioned frame, vertically arranged rotatable lifting elements carried by said transversely arranged frames, means carried by said transversely arranged frames for actuating said lifting elements and a vehicle body associated with said lifting elements.

14. In a vehicle of the class described the combination of a vehicle frame, frames arranged transversely to said first mentioned frame, rotatable lifting elements carried by said transversely arranged frames, means carried by said transversely arranged frames for actuating said rotatable lifting elements, a vehicle body associated with said lifting elements, a connection between said body and lifting elements whereby the weight of the body will be transmitted to said vehicle frame when said body is in lowered position.

15. In a vehicle the combination of a vehicle frame, frames arranged transversely to said first mentioned frame, rotatable lifting elements carried by said transversely arranged frames, means carried by said transversely arranged frames for actuating said lifting elements, a vehicle body associated with said lifting elements, and a connection between the body and lifting elements, whereby relative movement of said body and connection may be accomplished when said body is in its lowermost position.

16. In a vehicle the combination of a vehicle frame, frames arranged transversely to said vehicle frame, vertically arranged rotatable lifting elements carried by said transversely arranged frames, a vehicle body associated with said lifting elements and adapted to be raised and lowered by said lifting elements a connection between said lifting elements and said body, said connection being movable relatively to the lifting elements and said body when said body is in its lowermost position.

17. In a vehicle the combination of a vehicle frame, frames arranged transversely to said vehicle frames the ends of which extend beyond the sides of the vehicle frame, lifting elements carried adjacent the ends of the transversely arranged frames, another frame connected to the lifting elements and constructed to move toward and away from the transverse frame, a vehicle body carried by said frame which is secured to the lifting elements, said frame being permitted to engage and rest upon the vehicle frame and the first mentioned transverse frame when said body is in its lowermost position.

18. In a vehicle the combination of a vehicle frame, frames arranged transversely to the vehicle frame the ends of which extend beyond the sides of the vehicle frame, lifting elements carried by the transversely arranged frames, another frame connected to the lifting elements and constructed to move toward and away from the transversely arranged frames, a vehicle body carried by said frames which are secured to the lifting elements, said frames being permitted to engage and rest upon the vehicle frame when said body is in its lowermost position, and a connection between said movable frames and said lifting elements whereby said connection may be moved relatively to the lifting elements when said movable frames reach the vehicle frame.

19. In a vehicle of the class described the combination of a vehicle frame and a frame arranged transversely to the vehicle frame, lifting elements carried by said transverse frame, means for actuating said lifting elements, said means being carried by said transversely arranged frame, means for driving the actuating mechanism for the lifting elements said driving means being carried by the vehicle frame.

20. In a vehicle of the class described the combination of a vehicle frame and a frame arranged transversely to the vehicle frame, said vehicle and transversely arranged frames being arranged in relatively different planes, lifting elements carried by said transverse frame, means for actuating said lifting elements, said means being carried by said transversely arranged frame, means for driving the actuating mechanism for the lifting elements said driving means being carried by the vehicle frame, and a connection between said driving mechanism and the actuating mechanism for the lifting elements.

21. In a vehicle of the class described, the combination of a vehicle frame and a frame arranged transversely to and in a different plane than the vehicle frame the ends of said second mentioned frame being extended beyond the sides of the vehicle frame, lifting elements carried by said ends, means for actuating said lifting elements, said means being carried by said second mentioned frame, means for driving the actuating mechanism for the lifting elements, said driving means being carried by the vehicle frame.

22. In a vehicle of the class described the combination of a vehicle frame, and a frame the ends of which extend beyond the vehicle frame, lifting elements carried by said second mentioned frame, means for actuating said lifting elements, said means being carried by said second mentioned frame, means for driving the actuating mechanism for the lifting elements, said driving means being carried by the vehicle frame, and a connection between said driving mechanism and the actuating mechanism for the lifting elements.

23. In a vehicle of the class described, the combination of a vehicle frame, frames arranged adjacent the opposite ends of the vehicle frame, said last mentioned frames being extended laterally beyond the vehicle frame, threaded elements rising therefrom and being supported by said frames which extend beyond the vehicle frame, means for rotating the threaded elements, a vehicle body operable along the threaded elements to raise and lower said body, supports for the vehicle body extending therefrom to the threaded elements said supports having threaded portions provided to receive the rotatable threaded elements whereby the vehicle body is raised and lowered upon the rotation of said rotatable threaded elements.

24. In a vehicle of the class described, the combination of a vehicle frame, frames arranged adjacent the opposite ends of the vehicle frame, said last mentioned frames being extended laterally beyond the vehicle frame, threaded elements rising therefrom and being supported by said frames which extend beyond the vehicle frame, means for rotating the threaded elements, a vehicle body operable along the threaded elements to raise and lower said body, supports for the vehicle body extending therefrom to the threaded elements said supports having threaded portions provided to receive the rotatable threaded elements whereby the vehicle body is raised and lowered upon the rotation of said rotatable threaded elements, said supports for the vehicle body being engageable with the frames arranged adjacent the opposite ends of the vehicle frame when said vehicle body is in a lowered position.

25. In a vehicle of the class described, the combination of a vehicle frame, frames arranged adjacent the opposite ends of the vehicle frame, said last mentioned frames being extended laterally beyond the vehicle frame, threaded elements rising therefrom and being supported by said frame which extend beyond the vehicle frame, means for rotating the threaded elements, a vehicle body operable along the threaded elements to raise and lower said body, supports for the vehicle body extending therefrom to the threaded elements said supports having threaded portions provided to receive the rotatable threaded elements whereby the vehicle body is raised and lowered upon the rotation of said rotatable threaded elements, said vehicle body being permitted to engage and be supported by the vehicle frame when said body is in a lowered position.

In witness whereof, I hereunto subscribe my name this 1st day of April, A. D., 1921.

ARENT E. THOMPSON.